United States Patent [19]

Lees, Sr.

[11] Patent Number: 5,033,003

[45] Date of Patent: Jul. 16, 1991

[54] WHEEL MEASURING MACHINE

[75] Inventor: David W. Lees, Sr., North Canton, Ohio

[73] Assignee: Illinois Tool Works Inc., Glenview, Ill.

[21] Appl. No.: 531,837

[22] Filed: Jun. 1, 1990

[51] Int. Cl.⁵ .............................................. G01M 1/22
[52] U.S. Cl. ................................... 364/463; 364/506; 73/146; 73/8; 33/203.18
[58] Field of Search ....................... 364/463, 506, 508; 73/146, 146.5, 8; 33/203.12, 203.16, 203.18, 203.19

[56] References Cited

U.S. PATENT DOCUMENTS

| | | | |
|---|---|---|---|
| 4,298,948 | 11/1981 | Davis | 364/463 |
| 4,342,091 | 7/1982 | Whitehaus | 364/506 |
| 4,482,963 | 11/1984 | Lenaham et al. | 364/463 |
| 4,815,004 | 3/1989 | Beebe | 364/506 |
| 4,817,003 | 3/1989 | Nagase et al. | 364/463 |
| 4,837,980 | 6/1989 | Rogers, Jr. | 73/146 |

OTHER PUBLICATIONS

Sales Specification, Model 100 Wheel Uniformity SPC Machines; Specification 108-290-107 Revision 6, Feb. 1989 in its entirety.

Akron Standard Drawing No. 7682 dated 6/15/83 including revisions through revision 1 dated 6/21/84.
Akron Standard Drawing No. 8082 dated 6/11/84 (Revision 0).
Akron Standard Drawing No. 7541 dated 8/22/83 including revisions through revision 7 dated 11/15/84.

Primary Examiner—Parshotam S. Lall
Assistant Examiner—Brian M. Mattson
Attorney, Agent, or Firm—Wood, Herron & Evans

[57] ABSTRACT

A wheel measuring machine includes juxtaposed first and second spindles relatively movable toward and away from one another for mounting a wheel to be measured therebetween. A first centering device is mounted on the first spindle to selectively center a first surface feature of the wheel on an axis. The second spindle includes a second centering device engageable with both the wheel and with the first spindle to selectively center a second surface feature on the axis when the first centering device disengages the wheel. A distance transducer sensingly engageable with a third surface feature of the wheel measures the distance between points along the surface feature and the spindle axis once when the first surface feature is centered on the axis and again when the second surface feature is so centered. From those measurements, parameter values describing dimensional relationships between the surface features are calculated.

20 Claims, 2 Drawing Sheets

WHEEL MEASURING MACHINE

FIELD OF THE INVENTION

This invention relates to a machine for making centered measurements of surface features of a body and is particularly well suited for measuring vehicle wheels or wheel components.

BACKGROUND OF THE INVENTION

Wheels are normally manufactured from two components: a central disk or "spider" which is press fitted and welded inside a tire-supporting rim. The rim and disk each possess a number of significant surface features which, in order to produce a satisfactory wheel, must be properly shaped and/or maintained in a desired positional relationship with other surface features of the same component or, in the case of an assembled wheel, positioned correctly with respect to certain surface features of its mating component.

For instance, the disk usually contains a central pilot hole adapted to receive the center flange of a vehicle hub. The pilot is usually surrounded by a so-called "bolt circle" which comprises an array of four or five mutually spaced smaller holes ringing the pilot hole. The holes in the bolt circle receive lug bolts for effectively securing the disk to the hub. The bolt circle must be maintained concentric with the pilot hole within controlled tolerances.

The rim component of a wheel also includes a number of surface features of significance including pairs of opposed bead seats and safety humps, respectively, each of which must be of a proper diameter and properly centered with respect to one another on the rim. When the wheel is assembled, it is important that bead seats on the rim also be positioned properly with respect to the pilot and/or bolt circle on the disk. It is ordinarily desired that the bead seat be either concentric with the pilot or maintained in some specified non-concentric relationship with the pilot. Therefore, it is necessary to measure wheel components in order to ensure compliance with specifications. A wheel manufacturer may use measurement data so obtained not only to reject unacceptable wheels but also to look for trends in tolerances in order to maintain control production using modern statistical process control (SPC) techniques.

A known machine for measuring wheels included a rotatable spindle adapted for mounting either an expandable collet centeringly engageable with the pilot or bolt circle fixturing centeringly engageable with the bolt circle holes. With the collet mounted on the spindle, the wheel was mounted upon the collet, and the collet expanded into engagement with the edge of the pilot to center the pilot on the spindle. By rotating the wheel with a distance measuring probe engaging its bead seat, the distance between points along the bead seat and the center of the pilot were then measured and the measurement data stored in a computer connected to the probe. The rotation of the wheel was then stopped, the wheel was demounted from the collet and the collet then demounted from the spindle. Bolt circle fixturing was then mounted on the spindle in place of the collet and the wheel then mounted on the bolt circle fixturing to center the bolt circle on the spindle. The distance between the points on the bead seat and the center of the bolt circle were then measured again. The runout between the bolt circle and the pilot was then calculated by the computer by algebraically combining vectors representing the first harmonics of the two sets of measurement data.

The need to stop rotation of the spindle, demount the wheel, exchange fixtures, remount the wheel on the new fixture and resume rotation of the spindle prior to commencing measurements with reference to the center of a different surface feature render the operation of such machines inefficient and therefore costly.

It has also been known to provide a machine having a rotatable spindle equipped with pilot tooling to center the pilot on the axis of rotation of the spindle. With the pilot so centered on the spindle, a separate bolt circle measuring fixture was mounted in engagement with the bolt circle. The measuring fixture took the form of a precisely circular disk having fingers extending perpendicularly from a face of the disk to center the disk on the bolt circle. A distance measuring probe engageable with the peripheral edge of the disk could be used to measure the runout of the bolt circle with respect to the pilot directly. Similarly, a second distance measuring probe engageable with the bead seat was provided for direct measurement of the runout between the pilot and the bead seat.

While eliminating the need to demount and remount the wheel and exchange fixturing during a measuring operation, the latter machine suffered from a significant drawback in that it proved difficult to consistently mount and maintain the measuring surface of the bolt circle fixture perpendicular to the spindle axis of the machine. As a result, the distance measurements made with the probe would often include an erroneous wobble component.

SUMMARY OF THE INVENTION

A wheel measuring machine constructed in accordance with the present invention reduces the costs associated with wheel measuring operations while providing excellent measurement accuracy. The invention provides a wheel measuring machine capable of automatically centering different surface features of a wheel on a measuring axis, measuring and storing the distance between the axis and a plurality of angularly spaced points on the wheel while the measuring axis is centered on each respective surface feature and calculating various measurement values, all without having to demount and remount the wheel from the machine or manually exchange fixturing in the midst of measuring a given wheel.

A preferred embodiment of the invention includes juxtaposed rotatable first and second spindle means relatively movable toward and away from one another for mounting a wheel to be measured therebetween. The first spindle means includes first centering means, such as a selectively expandable collet to selectively center a first surface feature of the wheel, such as its pilot hole, on the rotational axis of the first spindle means. The second spindle means includes second centering means, such as a fixture having a plurality of pins. When the first centering means disengages the first surface feature, the second centering means engages both a second surface feature of the wheel, such as its bolt circle and the first spindle means to mechanically center the second surface feature on the axis of the first spindle means. A distance measuring probe engageable with a third surface feature of the wheel, such as its bead seat, measures the distance between points along the bead seat and the spindle axis a first time when the first surface feature is centered on that axis and a second time when the second surface feature is centered on that axis. From those measurements, the eccentricity between the first and second surface features as well as runouts between the various surface features can be determined using known computational techniques. The machine simplifies and reduces the cost of measuring operations in that there is no need to either demount the wheel from the machine or to manually exchange fixturing in the midst of measuring the wheel in order to measure runouts and/or eccentricity. Accuracy is improved by eliminating errors due to fixture wobble.

These and other advantages of the present invention will become more readily apparent from the following detailed description taken in conjunction with the accompanying drawings wherein like reference numerals denote like items and in which:

DETAILED DESCRIPTION OF THE PREFERRED EMBODIMENT

Figure 1:
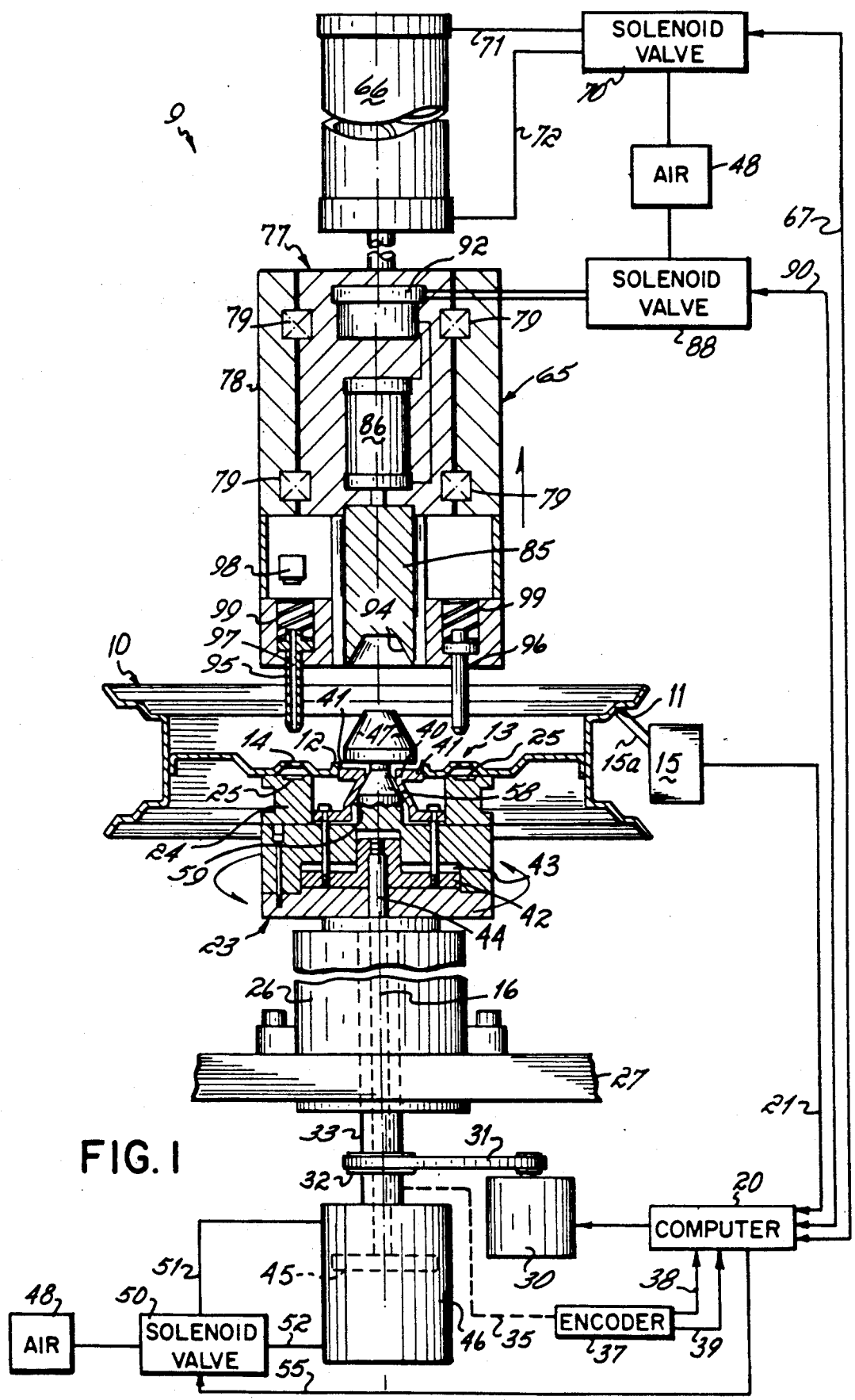
FIG. 1 is a diagrammatic elevational view partly in section of a wheel measuring machine constructed in accordance with the principles of the present invention and shown with a wheel to be measured mounted thereon, the pilot of the wheel being shown engaged by an expandable collet thereby centering the pilot an the measuring axis of the machine.

Referring to FIG. 1, there is shown a preferred embodiment of a wheel measuring machine 9 embodying the invention together with a wheel 10 to be measured. Wheel 10 has a number of surface features of interest including for example a bead seat 11, a circular pilot 12 and a bolt circle 13, all of which are generally circular in shape. Bolt circle 13 is defined as a circle intersecting the centers of a plurality of bolt holes 14 which surround pilot 12 at mutually angularly spaced intervals. Bead seat 11, pilot 12 and bolt circle 13 are arranged "generally concentrically" with one another. As that term is used herein and in the claims, it is meant that one of these surface features is disposed completely within the boundaries of another surface feature which in turn is disposed completely within yet another surface feature even though the centers of each surface feature may or may not be aligned with one another.

A distance measuring transducer 15 includes a sensor 15a disposed in distance sensing relation to bead seat 11. Transducer 15 measures the distances between a plurality of points on a measuring surface on wheel 10 such as bead seat 11 and a measuring axis 16 of machine 9. In the illustrated embodiment, axis 16 coincides with an axis of relative rotation between wheel 10 and sensor 15a. Transducer 15 feeds distance information to a computer 20 via an electrical communications line 21. Computer 20 is programmed for both controlling the operating cycle of machine 9 as well as for calculating one or more desired parameter values based on distance information received from transducer 15. Computer 20 may suitably comprise a standard commercially available type such as an IBM PS-2 model 80 with math coprocessor and TURBO PASCAL compiler version 5. Computer 20 also includes a CRT display and keyboard (not shown).

The wheel 10 is mounted upon on a lower rotatable spindle assembly 23 which includes a wheel support member 24 having a reflective surface which may suitably comprise a ring of reflective tape 25 located in the region immediately beneath the normal position of bolt circle 13. Spindle assembly 23 is rotatably supported by a bearing assembly 26 mounted atop a fixed frame 27 and is rotated under the control of computer 20 by a motor/drive 30 through a timing belt 31 connected to a pulley 32 on a shaft 33. In the illustrated embodiment, measuring axis 16 corresponds to the rotational axis of shaft 33. Shaft 33 is rotatably coupled to spindle assembly 25 and is mechanically or optically coupled at 35 to an encoder 37. Encoder 37 is connected to computer 20 via electrical communications lines 38 and 39. Once per rotation of shaft 33, encoder 37 produces a single reference pulse on line 39 and a plurality of, preferably two hundred fifty six (256), encoder pulses on line 38. By sampling the distance signal on line 21 synchronously with each encoder pulse received on line 38 and labelling each sample with reference to the total number of such encoder pulses received since the most recent appearance of a reference pulse on line 39, computer 20 can generate and store a series of 256 individual measurements of the distance between the measuring axis 16 of machine 9 and a corresponding series of angularly spaced points on bead seat 11.

Encoder 37 may comprise a commercially available shaft encoder connected to rotate synchronously with wheel 10. Alternatively, encoder 37 may be a non-contact type such as the optical device disclosed for use as a loadwheel encoder in commonly assigned U.S. Pat. No. 4,815,004 which is expressly incorporated herein by reference in its entirety. Those skilled in the art will also recognize that it is possible to eliminate encoder 37 by closely regulating the rotational speed of wheel 10, such as by substituting a synchronous motor for motor/drive 30 and then programming computer 20 to sample line 21 at precisely spaced intervals of time.

Spindle means 23 carries a selectively expandable collet 40 for selectively mechanically centering a first surface feature of wheel 10 such as pilot 12 with respect to axis 16. Collet 40 has radially movable, self-centering jaws 41 that are connected to an actuator plate 42 in a cavity 43. The plate 42 is connected to a rod 44 which is connected at its lower end to a piston 45 disposed within a double-acting cylinder 46. Cylinder 46 is connected to a suitable air supply 48 via a solenoid valve 50 through air lines 51 and 52 the latter two of which are coupled to cylinder 46 through suitable rotary union means (not shown). Solenoid valve 50 is connected by way of an electrical communications line 55 to computer 20 such that by applying an appropriate signal to line 55 computer 20 can selectively pressurize either line 51 or line 52 to move piston 45 either downward or upward, respectively.

When piston 45 is urged downwardly in response to a first signal from computer 20, plate 42 is likewise moved downwardly against the surface of a forcing cone 58 which is connected to spindle 25. The jaws 41 of collet 40 are configured to have an inwardly-tapered surfaces 59 which cooperate cone 58 such that as the surfaces 59 are pulled down against cone 58, jaws 41 spread radially outwardly to forcibly engage the edge of pilot 12 and thereby mechanically center pilot 12 on axis 16. With pilot 12 so centered, a first measurement phase which includes the taking of a first series of 256 individual distance measurements along bead seat 11, and which will later be described in further detail, can be carried out under the direction of computer 20. Lower spindle assembly 23 also includes a centering cone 47 centered on axis 16 which cooperates with components to be described below to center a second surface feature of wheel 10 on axis 16 during a second measurement phase.

The upper portion of machine 9 is used to mechanically center a second surface feature of wheel 10, such as bolt circle 13, with respect to measuring axis 16 prior to carrying out a second measurement phase. An axially reciprocable upper spindle assembly 65 is mounted juxtaposed and substantially axially aligned with lower spindle assembly 23. Upper spindle assembly 65 is supported upon frame 27 by a member thereof (not shown) and is connected to an actuator 66 such as a pneumatic cylinder that selectively lowers and raises spindle assembly 65 toward or away from spindle assembly 25 under the control of computer 20. Computer 20 controls the position of upper spindle assembly 65 through an electrical communications line 67 which is linked to a solenoid valve 70. Valve 70 is in turn pneumatically connected to cylinder 46 by way of air lines 71 and 72 and to common air supply 48. Spindle assembly 65 further includes a center portion 77 which is rotatably mounted within a sleeve 78 by bearings 79.

A centering cone register 85 is slidably mounted to the center portion 77 of upper spindle assembly 65. Register 85 is axially movable with respect to the other portions of upper spindle assembly 65 and can be selectively raised or lowered by a cylinder 86 mounted within center portion 77. Computer 20 controls the raising and lowering of centering cone register 85 by means of a solenoid valve 88 connected to computer 20 by way of an electrical communications line 90. Solenoid valve 88 is pneumatically coupled to common air supply 48 as well as to cylinder 86. A dual port rotary union 92 permits the necessary pneumatic connections between solenoid value 88 and cylinder 86 to be made while permitting the center portion 77 of upper spindle 65 to rotate freely within sleeve 78. Centering cone register 85 has a female taper 94 at its lower end. Taper 94 is matable with centering cone 47 which has a male taper. When centering cone 47 is engaged by the taper 94 of centering cone register 85 in response to a second signal from computer 20 appearing on line 90, such engagement mechanically centers upper spindle 65 and certain fixturing carried by spindle 65 with the measuring axis 16 of machine 9.

Upper spindle 65 carries fixturing for selectively centering a second surface feature of wheel 10, such as bolt circle 13, on measuring axis 16. In the illustrated embodiment, this fixturing takes the form of a plurality of downwardly projecting bolt hole pins 95 and 96. The number and position of pins 95, 96 is determined by the number and arrangement of the bolt holes 14 making up the bolt circle 13 of the particular type of wheel 10 being measured. Biasing springs 99 urge pins 95, 96 downwardly toward the wheel 10 to facilitate positive engagement with the holes 14 defining bolt circle 13.

To facilitate automatic alignment of pins 65, 66 with bolt holes 14, one of the pins 95 is provided with an axial hollow bore 97 and has position sensing means, such as an electric eye 98 mounted above it. Electric eye 98 is coupled to computer 20 by an electrical communications line (not shown) and is focused through bore 97 to detect alignment of a bolt hole 14 with pin 65 due to the reflection of light from the surface of reflective tape 25 passing through bore 97.

In operation, the wheel 10 to be measured is placed onto lower spindle assembly 23 and the jaws 41 of collet 40 are initially expanded in response to a signal from computer 20 to rotationally couple wheel 10 to shaft 33 and importantly to mechanically center the pilot 12 of wheel 10 on the measuring axis 16 of machine 9 as shown in FIG. 1. If bolt circle 13 is not concentric with pilot 12, the upper spindle assembly 65 is capable of shifting radially somewhat and will be correspondingly misaligned.

Rotation of lower spindle assembly 23 and wheel 10 are then commenced by motor/drive 30 in response to a signal from computer 20. Lower spindle 34 is initially rotated slowly until computer 20 receives a signal from photocell 67 indicating that a bolt hole 14 as passed under the pin 65. The computer then signals motor/drive 30 to rotate the number of degrees required to bring the next bolt hole under the pin 65 and hence all of the bolt holes under the pins 65, 66 before momentarily deactivating motor/drive 30. Computer 20 then energizes solenoid valve 70 to extend cylinder 66 thereby urging upper spindle assembly 65 downwardly to clamp wheel 10 between upper spindle assembly 65 and lower spindle assembly 23 to prevent wobble. At this time, computer 20 maintains solenoid valve 88 deenergized to ensure that centering cone register 85 remains retracted so as to remain disengaged from centering cone 47. Accordingly, wheel 10 is positioned such that pilot 12 remains mechanically centered with respect to axis 16. Probe 15 is brought into measuring relation with bead seat 11. Motor/drive 30 is again activated in response to a signal from computer 20 thereby effecting relative rotation between wheel 10 and probe 15. Computer 20 then generates an internal third signal which initiates the first measurement phase of the operating cycle of machine 9.

Figure 2:
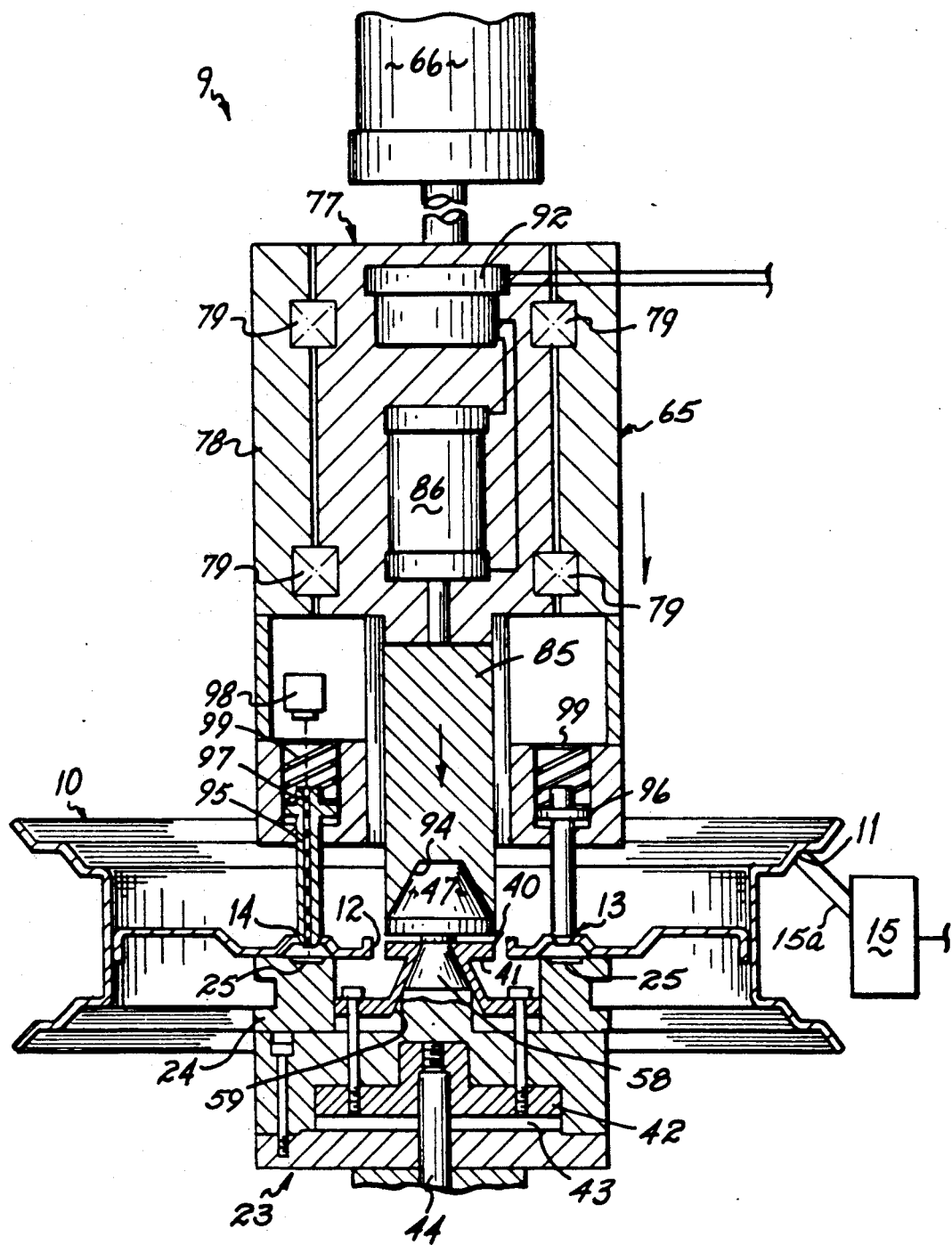
FIG. 2 is a partial diagrammatic elevational view partly in section of the machine of FIG. 1 shown with the collet disengaged from the pilot and with the bolt circle of the wheel engaged by centering pins thereby centering the bolt circle on the measuring axis of the machine.

In the first measurement phase, computer 20 samples the distance signal appearing on line 21 two hundred fifty six times as wheel 10 is rotated through one complete revolution and stores a corresponding series of two hundred fifty six individual measurements. Each individual measurement represents the distance between an angularly defined location on bead seat 11 and axis 16. In order to arrive at a parameter value indicating the total indicated runout (TIR) of bead seat 11 measured with respect to the center of pilot 12 computer 20 subtracts the smallest sample in the above series from the largest sample in that series. That parameter value is stored, displayed and/or communicated to peripheral equipment (not shown) by computer 20. Using well known Fourier analysis techniques computer 20 also calculates and stores the magnitude and angle of the first harmonic of the first series of individual measurements for a purpose to be described hereinafter. Following the first measurement phase, a second measurement phase which will now be described with reference to FIG. 2 is commenced.

Measuring probe 15 is preferably disengaged from bead seat 11 and the jaws 41 of collet 40 are unlocked by raising the plate 42. To unlock collet 40, computer 20 sends a signal by way of line 55 causing solenoid valve 50 to pressurize line 52 thereby raising the piston 45 of cylinder 46 and moving collet actuator plate 42 upwardly. With collet 40 disengaged, wheel 10 is freed so that it can be positioned with a second surface feature centered on axis 16.

Computer 20 then sends the second signal to solenoid valve 88 via line 90 to extend cylinder 86. As a result, centering cone register 85 is driven downwardly so that centering cone 47 forcibly mates with the female taper 94 of register 85 in order to align the axis of the upper spindle assembly 65 with the measuring axis 16. In this operation, the pins 95, 96 will act to shift the position of wheel 10 as needed to mechanically center bolt circle 13 on the measuring axis 16 of machine 9. Once again probe 15 is brought into measuring relation with bead seat 11 and computer 20 energizes motor/drive 30 to rotate wheel 10. Computer 20 then executes a second measurement phase by measuring and storing the distances between measuring axis 16 and each of the same two hundred fifty-six angularly spaced points on bead seat 11 which were measured during the first measurement phase. The runout of bolt circle 13 with respect to bead seat 11 is then calculated by computer 20 by subtracting the smallest individual measurement in this second series of measurements from the largest individual measurement therein.

The magnitude and angle of the first harmonic of the second series of individual measurements is then calculated and stored by computer 20. In order to measure the eccentricity between the bolt circle 13 and pilot 12, computer 20 calculates the difference between the previously calculated and stored first harmonic of the first series of individual measurements and the first harmonic of the second series of individual measurements.

Computer 20 stores the runout and/or eccentricity values, causes them to be displayed on the CRT display of computer 20 and/or communicates them to peripheral equipment for production data logging and/or production control purposes. Computer 20 may also compare these parameter values or a series of such values with numerical and/or statistical limits previously entered into computer 20 via its keyboard and generate signals indicative of whether the parameter values are outside such limits for the purpose of rejecting unacceptable wheels and/or initiating appropriate corrective action. Computer 20 can also be programmed to compile reports and/or generate signals indicative of trends in parameter values to facilitate control of the production process for wheels and/or their various component parts.

While the apparatus described above constitutes a preferred embodiment of the invention, it is to be understood that the invention is not limited to same since, as those skilled in the art will readily recognize in light of the present disclosure, changes can be made thereto without departing from the scope of the invention as particularly pointed out and distinctly claimed in the appended claims including all legal equivalents.

What is claimed is:

1. A machine for measuring a body, said body having a first surface feature, a second surface feature and a third surface feature, said surface features being arranged generally concentrically with one another, said machine comprising:

first spindle means for supporting the body, said first spindle means being disposed in a fixed relation to a measuring axis;

second spindle means juxtaposed to said first spindle means;

first centering means coupled to said first spindle means for selectively mechanically centering said first surface feature on said axis;

second centering means disposed at least partially on said second spindle means and selectively couplable to both said body and said first spindle means for selectively mechanically centering said second surface feature on said axis;

distance measuring means for selectively carrying out a first series of measurements and a second series of measurements of the distance between said axis and each of a plurality of angularly spaced points on said third surface feature;

control means connected to said distance measuring means, said first centering means and to said second centering means for initiating said first series of measurements when said first surface feature is centered on said axis and for initiating said second series of measurements when said second surface feature is centered on said axis, and calculating means coupled to said distance measuring means for calculating in accordance with at least one of said first series and second series, the value of a parameter describing a dimensional relationship between two of said surface features.

2. The machine of claim 1 wherein said calculating means includes means for calculating magnitude and angle of a harmonic of both said first series of measurements and of a corresponding harmonic of said second series of measurements and for calculating the difference between said harmonic and said corresponding harmonic in order to determine a parameter value describing the eccentricity between said first surface feature and said second surface feature.

3. The machine of claim 1 wherein said calculating means includes means for calculating a parameter value describing runout of said third surface feature with respect to a center of at least one of said first surface feature and said second surface feature.

4. The machine of claim 1 wherein said body comprises a wheel.

5. The machine of claim 1 further comprising driving means for effecting relative rotation about said measuring axis between said body and said distance measuring means sensor.

6. The machine of claim 1 further comprising actuator means coupled to at least one of said first spindle means and said second spindle means for selectively moving said first and second spindle means (i) relatively toward one another to hold the body therebetween and (ii) relatively apart permitting loading and removal of the body from therebetween.

7. A machine for measuring a wheel having a pilot, a plurality of bolt holes defining a bolt circle surrounding the pilot, and a generally circular surface feature surrounding the pilot, said machine comprising:

first spindle means for supporting the wheel, said first spindle means being disposed in fixed relation to a measuring axis;

second spindle means juxtaposed to said first spindle means;

first centering means coupled to said first spindle means for selectively mechanically centering said pilot on said axis;

second centering means disposed at least partially on said second spindle means and selectively couplable to the wheel and to said first spindle means for selectively mechanically centering said bolt circle on said axis;

distance measuring means for carrying out a first series of measurements and a second series of measurements of the distance between said axis and each of a plurality of angularly spaced points on said surface feature;

control means connected to said distance measuring means, said first centering means and to said second centering means for initiating said first series of measurements when said first surface feature is centered on said axis and for initiating said second series of measurements when said second surface feature is centered on said axis, and calculating means coupled to said distance measuring means for determining in accordance with at least one of said first and second measurements the value of a parameter describing a dimensional relationship between two of said surface features.

8. The machine of claim 7 wherein said calculating means includes means for calculating magnitude and angle of a harmonic of both said first series of measurements and of a corresponding harmonic of said second series of measurements and for calculating the difference between said harmonic and said corresponding harmonic in order to determine a parameter value describing the eccentricity between said pilot and said bolt circle.

9. The machine of claim 7 wherein said calculating means includes means for calculating a parameter value describing runout of said surface feature with respect to the center of at least one of said pilot and said bolt circle.

10. The machine of claim 7 further comprising driving means for effecting relative rotational movement about said axis between said wheel and said distance measuring means.

11. The machine of claim 7 further comprising actuator means coupled to at least one of said first spindle means and said second spindle means for selectively moving said first and second spindle means (i) relatively toward one another to hold the wheel therebetween and (ii) relatively apart permitting loading and removal of the wheel from therebetween.

12. A machine for measuring a wheel, said wheel having at least three surface features including a pilot, a plurality of bolt holes defining a bolt circle surrounding the pilot, and a third surface feature, said machine comprising:

lower spindle means for supporting said wheel, said lower spindle means being rotatable about an axis;

an expandable collet mounted on said lower spindle and engageable with said pilot to selectively center said pilot on said axis;

upper spindle means positioned juxtaposed to said lower spindle means;

a bolt circle fixture on said upper spindle means, said fixture being selectively engageable with said bolt holes and with said lower spindle means to selectively center said bolt circle on said axis;

distance measuring means disposed in distance-sensing relation with the third surface feature for selectively measuring the distances between a plurality of angularly spaced points on the third surface feature and said axis:

(i) at one time when said collet is in engagement with said pilot to center said pilot on said axis to generate a first series of measurements, and (ii) at another time when said collet is disengaged from said pilot and said bolt circle fixture is engaged with both said lower spindle and with said bolt holes to center said bolt circle on said axis in order to generate a second series of measurements, and calculating means coupled to said distance measuring means for calculating in accordance with at least one of said first series and said second series, the value of a parameter describing a dimensional relationship between two of said surface features.

13. The machine of claim 12 wherein said calculating means includes means for calculating magnitude and angle of a harmonic of both said first series of measurements and of a corresponding harmonic of said second series of measurements and for calculating the difference between said harmonic and said corresponding harmonic in order to determine a parameter value describing the eccentricity between said pilot and said bolt circle.

14. The machine of claim 12 wherein said calculating means includes means for calculating a parameter value describing runout of said surface feature with respect to the center of at least one of said pilot and said bolt circle.

15. The machine of claim 12 further comprising actuator means coupled to at least one of said first spindle means and said second spindle means for selectively moving said first and second spindle means (i) relatively toward one another to hold the wheel therebetween and (ii) relatively apart permitting loading and removal of the wheel from therebetween.

16. A machine for measuring a body, said body having a first surface feature, a second surface feature and a third surface feature, said surface features being arranged generally concentrically with one another, said machine comprising:

(a) first spindle means for supporting the body, said first spindle means being disposed in fixed relation to an axis;

(b) second spindle means juxtaposed to said first spindle means;

(c) first centering means coupled to said first spindle means for selectively mechanically centering said first surface feature on said axis in response to a first signal;

(d) second centering means disposed at least partially on said second spindle means and selectively couplable to both said body and said first spindle means for selectively mechanically centering said second surface feature on said axis in response to a second signal;

(e) distance measuring means for selectively carrying out a first series of measurements and a second series of measurements of the distance between each of a plurality of points on said third surface feature and said axis, said first series of measurements being carried out in response to a third signal, said second series of measurements being carried out in response to a fourth signal;

(f) control means connected to said first centering means, said second centering means and said distance measuring means for generating said first signal, said second signal, said third signal and said fourth signal, said third signal being generated following generation of said first signal so that said first series of measurements is carried out when said first surface feature is centered on said axis, said fourth signal being generated following generation of said second signal so that said second series of measurements is carried out when said second surface feature is centered on said axis, and (g) calculating means coupled to said distance measuring means for determining in accordance with at least one of said first series and second series of measurements, the value of at least one parameter describing a dimensional relationship between two of said surface features.

17. The machine of claim 16 wherein said calculating means includes means for calculating magnitude and angle of a harmonic of both said first series of measurements and of a corresponding harmonic of said second series of measurements and for calculating the difference between said harmonic and said corresponding harmonic in order to determine a parameter value describing the eccentricity between said first surface feature and said second surface feature.

18. The machine of claim 16 wherein said calculating means includes means for calculating a parameter value describing runout of said third surface feature with respect to a center of at least one of said first surface feature and said second surface feature.

19. The machine of claim 16 wherein said body comprises a wheel and further comprising driving means for effecting relative rotational movement about said axis between said wheel and said distance measuring means.

20. The machine of claim 19 further comprising actuator means coupled to at least one of said first spindle means and said second spindle means for selectively moving said first and second spindle means (i) relatively toward one another to hold the wheel therebetween and (ii) relatively apart permitting loading and removal of the wheel from therebetween.

* * * * *

UNITED STATES PATENT AND TRADEMARK OFFICE
CERTIFICATE OF CORRECTION

PATENT NO.  : 5,033,003

DATED       : July 16, 1991

INVENTOR(S) : David W. Lees, Sr.

It is certified that error appears in the above-identified patent and that said Letters Patent is hereby corrected as shown below:

Column 8,    line 46, "sensor" should be deleted

Signed and Sealed this

Twenty-seventh Day of April, 1993

Attest:

MICHAEL K. KIRK

Attesting Officer

Acting Commissioner of Patents and Trademarks